(12) United States Patent
O'Neil et al.

(10) Patent No.: US 7,075,703 B2
(45) Date of Patent: Jul. 11, 2006

(54) PROCESS FOR SEALING ELECTRO-OPTIC DISPLAYS

(75) Inventors: Steven J. O'Neil, Pembroke, MA (US); Gregg M. Duthaler, Needham, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/905,582

(22) Filed: Jan. 12, 2005

(65) Prior Publication Data
US 2005/0168801 A1    Aug. 4, 2005

Related U.S. Application Data

(60) Provisional application No. 60/481,903, filed on Jan. 16, 2004.

(51) Int. Cl.
*G02B 26/00* (2006.01)
(52) U.S. Cl. ............... 359/296; 445/25; 349/153; 349/190; 156/107
(58) Field of Classification Search ............... 359/296, 359/290, 315, 316, 321, 252, 253; 345/107; 349/153, 190; 445/25; 156/107
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 5,745,094 A | 4/1998 | Gordon, II et al. |
| 5,760,761 A | 6/1998 | Sheridon |
| 5,777,782 A | 7/1998 | Sheridon |
| 5,793,461 A * | 8/1998 | Inou .................. 349/153 |
| 5,808,783 A | 9/1998 | Crowley |
| 5,852,484 A * | 12/1998 | Inoue et al. ............ 349/86 |
| 5,872,552 A | 2/1999 | Gordon, II et al. |
| 5,930,026 A | 7/1999 | Jacobson et al. |

(Continued)

FOREIGN PATENT DOCUMENTS

EP    1 145 072 B1    5/2003

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Hung Xuan Dang
*Assistant Examiner*—Joseph Martinez
(74) *Attorney, Agent, or Firm*—David J. Cole

(57) ABSTRACT

An electro-optic display (100) comprising a backplane (102), a layer (112) of electro-optic material and a protective layer (128) capable of absorbing ultra-violet radiation and disposed on the opposed side of the layer (112) of electro-optic material from the backplane (102), is provided with an edge seal (130). The protective layer (128) extends beyond the layer (112) of electro-optic material, thus leaving a peripheral gap between the protective layer (128) and the backplane (102). To form the edge seal (130) an uncured edge sealing material curable by radiation transmitted by the protective layer (128) is placed in the gap and cured by transmitting radiation through the protective layer (128).

16 Claims, 1 Drawing Sheet

U.S. PATENT DOCUMENTS

| | | |
|---|---|---|
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B1 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B1 | 11/2002 | Turner et al. |
| 6,498,114 B1 | 12/2002 | Amundson et al. |
| 6,504,524 B1 | 1/2003 | Gates et al. |
| 6,506,438 B1 | 1/2003 | Duthaler et al. |
| 6,512,354 B1 | 1/2003 | Jacobson et al. |
| 6,515,649 B1 | 2/2003 | Albert et al. |
| 6,518,949 B1 | 2/2003 | Drzaic |
| 6,521,489 B1 | 2/2003 | Duthaler et al. |
| 6,531,997 B1 | 3/2003 | Gates et al. |
| 6,535,197 B1 | 3/2003 | Comiskey et al. |
| 6,538,801 B1 | 3/2003 | Jacobson et al. |
| 6,545,291 B1 | 4/2003 | Amundson et al. |
| 6,580,545 B1 | 6/2003 | Morrison et al. |
| 6,636,290 B1 * | 10/2003 | Glownia et al. ............ 349/187 |
| 6,639,578 B1 | 10/2003 | Comiskey et al. |
| 6,652,075 B1 | 11/2003 | Jacobson |
| 6,657,772 B1 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B1 | 1/2004 | Kazlas et al. |
| 6,693,620 B1 | 2/2004 | Herb et al. |
| 6,704,133 B1 | 3/2004 | Gates et al. |
| 6,710,540 B1 | 3/2004 | Albert et al. |
| 6,721,083 B1 | 4/2004 | Jacobson et al. |
| 6,724,519 B1 | 4/2004 | Comiskey et al. |
| 6,727,881 B1 | 4/2004 | Albert et al. |
| 6,738,050 B1 | 5/2004 | Comiskey et al. |
| 6,750,473 B1 | 6/2004 | Amundson et al. |
| 6,753,999 B1 | 6/2004 | Zehner et al. |
| 6,788,449 B1 | 9/2004 | Liang et al. |
| 6,816,147 B1 | 11/2004 | Albert |
| 6,819,471 B1 | 11/2004 | Amundson et al. |
| 6,822,782 B1 | 11/2004 | Honeyman et al. |
| 6,825,068 B1 | 11/2004 | Denis et al. |
| 6,825,829 B1 | 11/2004 | Albert et al. |
| 6,825,970 B1 | 11/2004 | Goenaga et al. |
| 6,831,769 B1 | 12/2004 | Holman et al. |
| 6,839,158 B1 | 1/2005 | Albert et al. |
| 6,842,167 B1 | 1/2005 | Albert et al. |
| 6,842,279 B1 | 1/2005 | Amundson |
| 6,842,657 B1 | 1/2005 | Drzaic et al. |
| 6,864,875 B1 | 3/2005 | Drzaic et al. |
| 6,865,010 B1 | 3/2005 | Duthaler et al. |
| 6,866,760 B1 | 3/2005 | Paolini Jr. et al. |
| 6,870,657 B1 | 3/2005 | Fitzmaurice et al. |
| 6,870,661 B1 | 3/2005 | Pullen et al. |
| 6,900,851 B1 | 5/2005 | Morrison et al. |
| 6,922,276 B1 | 7/2005 | Zhang et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 | 12/2002 | Webber |
| 2003/0011560 A1 | 1/2003 | Albert et al. |
| 2003/0020844 A1 | 1/2003 | Albert et al. |
| 2003/0102858 A1 | 6/2003 | Jacobson et al. |
| 2003/0132908 A1 | 7/2003 | Herb et al. |
| 2003/0137521 A1 | 7/2003 | Zehner et al. |
| 2003/0151702 A1 | 8/2003 | Morrison et al. |
| 2003/0214695 A1 | 11/2003 | Abramson et al. |
| 2003/0222315 A1 | 12/2003 | Amundson et al. |
| 2004/0012839 A1 | 1/2004 | Cao et al. |
| 2004/0014265 A1 | 1/2004 | Kazlas et al. |
| 2004/0027327 A1 | 2/2004 | LeCain et al. |
| 2004/0075634 A1 | 4/2004 | Gates |
| 2004/0094422 A1 | 5/2004 | Pullen et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0136048 A1 | 7/2004 | Arango et al. |
| 2004/0155857 A1 | 8/2004 | Duthaler et al. |
| 2004/0157977 A1 | 8/2004 | Kotsubo et al. |
| 2004/0180476 A1 | 9/2004 | Kazlas et al. |
| 2004/0190114 A1 | 9/2004 | Jacobson et al. |
| 2004/0196215 A1 | 10/2004 | Duthaler et al. |
| 2004/0209008 A1 | 10/2004 | Liang et al. |
| 2004/0226820 A1 | 11/2004 | Webber et al. |
| 2004/0239614 A1 | 12/2004 | Amundson et al. |
| 2004/0252360 A1 | 12/2004 | Webber et al. |
| 2004/0257635 A1 | 12/2004 | Paolini, Jr. et al. |
| 2004/0263947 A1 | 12/2004 | Drzaic et al. |
| 2005/0000813 A1 | 1/2005 | Pullen et al. |
| 2005/0001810 A1 | 1/2005 | Yakushiji et al. |
| 2005/0001812 A1 | 1/2005 | Amundson et al. |
| 2005/0007336 A1 | 1/2005 | Albert et al. |
| 2005/0007653 A1 | 1/2005 | Honeyman et al. |
| 2005/0012980 A1 | 1/2005 | Wilcox et al. |
| 2005/0017944 A1 | 1/2005 | Albert |
| 2005/0018273 A1 | 1/2005 | Honeyman et al. |
| 2005/0024353 A1 | 2/2005 | Amundson et al. |
| 2005/0035941 A1 | 2/2005 | Albert et al. |
| 2005/0041004 A1 | 2/2005 | Gates et al. |
| 2005/0062714 A1 | 3/2005 | Zehner et al. |
| 2005/0067656 A1 | 3/2005 | Denis et al. |
| 2005/0078099 A1 | 4/2005 | Amundson et al. |
| 2005/0099672 A1 | 5/2005 | Jacobson et al. |
| 2005/0105159 A1 | 5/2005 | Paolini, Jr. et al. |
| 2005/0122284 A1 | 6/2005 | Gates et al. |

| | | |
|---|---|---|
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0122565 A1 | 6/2005 | Doshi et al. |
| 2005/0151709 A1 | 7/2005 | Jacobson et al. |
| 2005/0152022 A1 | 7/2005 | Honeyman et al. |
| 2005/0168799 A1 | 8/2005 | Whitesides et al. |
| 2005/0179642 A1 | 8/2005 | Wilcox et al. |

FOREIGN PATENT DOCUMENTS

| | | |
|---|---|---|
| EP | 1 462 847 | 9/2004 |
| EP | 1 482 354 | 12/2004 |
| EP | 1 484 635 | 12/2004 |
| EP | 1 500 971 A1 | 1/2005 |
| EP | 1 501 194 A1 | 1/2005 |
| EP | 1 536 271 | 6/2005 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 03/107315 | 12/2003 |
| WO | WO 2004/001498 | 12/2003 |
| WO | WO 2004/008239 | 1/2004 |
| WO | WO 2004/055586 | 7/2004 |
| WO | WO 2004/059379 | 7/2004 |
| WO | WO 2004/077140 | 9/2004 |
| WO | WO 2004/079442 | 9/2004 |
| WO | WO 2004/090626 | 10/2004 |

OTHER PUBLICATIONS

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Hayes, R.A., et al., "Video-Speed Electronic Paper Based on Electrowetting", Nature, vol. 425, pp. 383-385 (Sep. 25, 2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

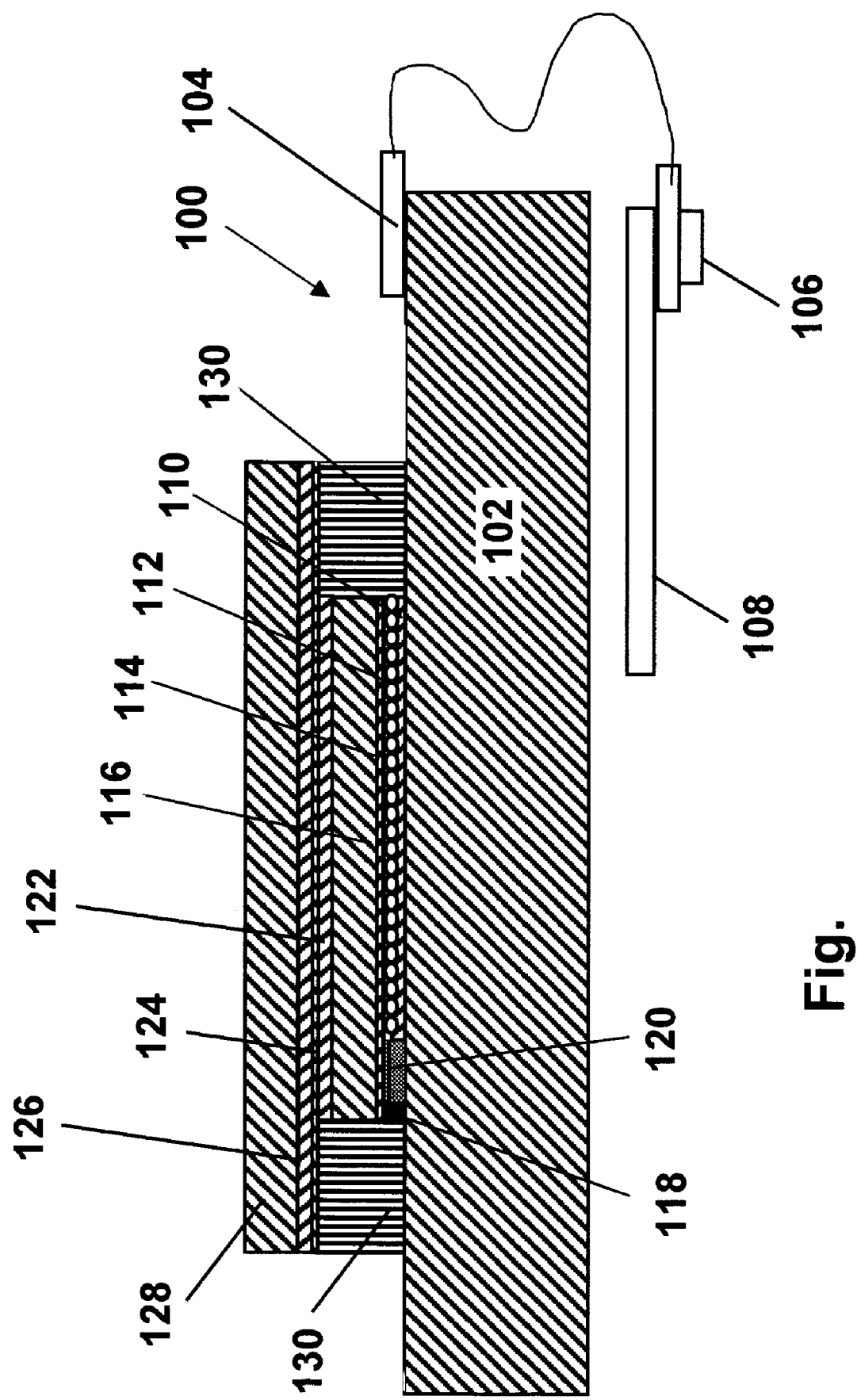

PROCESS FOR SEALING ELECTRO-OPTIC DISPLAYS

REFERENCE TO RELATED APPLICATIONS

This application claims benefit of Provisional Application Ser. No. 60/481,903, filed Jan. 16, 2004.

This invention is related to copending application Ser. No. 10/249,957, filed May 22, 2003 (Publication No. 2004/0027327), and to copending application Ser. No. 10/605,024, filed Sep. 2, 2003 (Publication No. 2004/0155857). The entire disclosures of these two copending applications, and of all U.S. patents and published and copending applications referred to below, are also herein incorporated by reference.

BACKGROUND OF INVENTION

This invention relates to a process for sealing electro-optic displays; this process is especially, although not exclusively, intended for use in sealing such displays using encapsulated electrophoretic media. However, the invention can also make use of various other types of electro-optic displays which use an electro-optic medium which is solid, in the sense that it has solid external surfaces, although the medium may, and often does, have internal cavities which contain a fluid (either liquid or gas). Thus, the term "solid electro-optic displays" includes encapsulated electrophoretic displays, encapsulated liquid crystal displays, and other types of displays discussed below.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. patent application Ser. No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", Asia Display/IDW '01 (Proceedings of the 21st International Display Research Conference in conjunction with The 8th International Display Workshops, Oct. 16–19, 2001, Nagoya, Japan), page 1517, Paper HCS1-1, and Yamaguchi, Y, et al., "Toner display using insulative particles charged triboelectrically", Asia Display/IDW '01, page 1729, Paper AMD4-4. See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT)

and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851;6,130,773;6,130,774;6,172,798;6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,727,881; 6,738,050; 6,750,473; 6,753,999; 6,816,147; 6,819,471; 6,822,782; 6,825,068; 6,825,829; 6,825,970; 6,831,769; and 6,839,158; and U.S. Patent Applications Publication Nos. 2002/0060321; 2002/ 0063661; 2002/0090980; 2002/0113770; 2002/0130832; 2002/0131147; 2002/0171910; 2002/0180687; 2002/ 0180688; 2003/0011560; 2003/0020844; 2003/0025855; 2003/0102858; 2003/0132908; 2003/0137521; 2003/ 0151702; 2003/0214695; 2003/0214697; 2003/0222315; 2004/0008398; 2004/0012839; 2004/0014265; 2004/ 0027327; 2004/0075634; 2004/0094422; 2004/0105036; 2004/0112750; 2004/0119681; and 2004/0196215; and International Applications Publication Nos. WO 99/67678; WO 00/05704; WO 00/3 8000; WO 00/38001; WO 00/36560; WO 00/67110; WO 00/67327; WO 01/07961; WO 01/08241; WO 03/107,315; WO 2004/023195; WO 2004/049045; WO 2004/059378; WO 2004/088002; WO 2004/088395; WO 2004/090857; and WO 2004/099862.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Another type of electro-optic display is an electro-wetting display developed by Philips and described in an article in the Sep. 25, 2003 issue of the Journal "Nature" and entitled "Performing Pixels: Moving Images on Electronic Paper". It is shown in copending application Ser. No. 10/711,802, filed Oct. 6, 2004 (Publication No. 2005/0151709), that such electro-wetting displays can be made bistable.

Other types of electro-optic materials may also be used in the present invention. Of particular interest, bistable ferroelectric liquid crystal displays (FLC's) are known in the art.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display useable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, as described in U.S. Patent Applications Publication Nos. 2003/0011867 (now U.S. Pat. No. 6,657,772) and 2003/0025855, especially in the case of a display using an encapsulated electrophoretic medium. The lamination adhesive must have sufficient adhesive strength to bind the electro-optic layer to the layer (typically an electrode layer) to which it is to be laminated, and in the case of an encapsulated electrophoretic medium, the adhesive must also have sufficient adhesive strength to mechanically hold the capsules together. If the electro-optic display is to be of a flexible type (and one of the important advantages of rotating bichromal member and encapsulated electrophoretic displays is that they can be made flexible), the adhesive must have sufficient flexibility not to introduce defects into the display when the display is flexed. The lamination adhesive must have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 130° C. since the medium cannot be exposed to substantially higher temperatures without damage, but the flow of the adhesive must cope with the relatively uneven surface of the capsule-containing layer, the surface of which is rendered irregular by the underlying capsules. The lamination adhesive must be chemically compatible with all the other materials in the display.

In considering the choice of a lamination adhesive for use in an electro-optic display, attention must be paid to the process by which the display is to be assembled. Most prior art methods for final lamination of electrophoretic displays are essentially batch methods in which the electro-optic medium, the lamination adhesive and the backplane are only brought together immediately prior to final assembly, and it is desirable to provide methods better adapted for mass production. However, the aforementioned 2004/0027327 describes a method of assembling a solid electro-optic display (including a particle-based electrophoretic display) which is well adapted for mass production. Essentially, this published application describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this copending application and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or indium-tin-oxide (ITO), or may be a conductive polymer. Polyethylene terephthalate (PET) films coated with aluminum or ITO are available commercially, for example as "aluminized Mylar" ("Mylar" is a Registered Trade Mark) from E. I. du Pont de Nemours & Company, Wilmington, Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned 2004/0027327 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned 2004/0027327 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate previously described. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display.

The aforementioned 2004/0027327 also describes the importance of protecting the electro-optic medium from environmental contaminants, since some electro-optic media are sensitive to humidity and ultra-violet radiation, and most such media are susceptible to mechanical damage. This published application illustrates, in FIG. 10, a process in which a protective film is laminated over a front plane laminate in the same lamination operation by which the front plane laminate; such a protective film can protect the electro-optic medium against ingress of moisture, other liquids, and some gases. However, even with such a protective film, the edge of the electro-optic medium is still exposed to the environment, and this copending application teaches that it is also advisable for the display to include an edge seal, which serves to prevent the ingress of moisture and other contaminants around the outer edges of the display. Various types of edge seal are illustrated in FIGS. 11–17 of this published application. This edge seal can be composed of metallized foil or other barrier foil adhered over the edge of the FPL, dispensed sealants (thermal, chemical, and/or radiation cured), polyisobutylene or acrylate-based sealants, and so on. It has been found that hybrid radiation and thermal cure sealants (i.e. UV curable with thermal post-bake) offer certain advantages to display system performance. Threebond 30Y-491 material (from Threebond Corporation, Cincinnati, Ohio) is especially preferred because of its favorable water vapor barrier properties, low viscosity at elevated temperature, for easy dispensing of the edge seal material, good wetting characteristics, and manageable curing properties. Those skilled in the art and familiar with advanced sealants will be able to identify other sealants that offer comparable performance.

FIG. 20 of the aforementioned 2004/0027327, which is reproduced in modified form as the sole Figure of the accompanying drawings, shows a preferred form of electro-optic display having front protective layers and an edge seal. As will be seen from the accompanying drawing, this preferred display (generally designated 100) comprises a thin film transistor (TFT) backplane 102 generally similar to backplanes used with liquid crystal displays and having a matrix of pixel electrodes and associated thin film transistors and conductors for independently controlling the voltage applied to the pixel electrodes; the pixel electrodes and conductors are omitted from the Figure for clarity. A tape connect package 104 is connected to a peripheral portion of the backplane 102 and is provided with a driver integrated circuit 106 (which controls the operation of the display 100); the tape connect package 104 is also connected to a printed circuit board 108 which contains additional circuitry for controlling the operation of the display 100.

On the upper surface (as illustrated in the Figure) of the backplane 102 are disposed a layer 110 of lamination adhesive, a layer 112 of an electro-optic medium (illustrated as an encapsulated electrophoretic medium as described in the aforementioned E Ink and MIT patents, although other types of electro-optic media can also be used), a front electrode 114 and a front substrate 116; the front electrode 114 and front substrate 116 are both conveniently formed from an indium-tin-oxide coated polymeric film, and such coated films are readily available commercially. The layers 110 and 112, the front electrode 114 and front substrate 116 are all derived from a front laminate which has been laminated to the backplane 102. It will be seen from the Figure that one portion (the left-hand end as illustrated) of the front electrode 114 and front substrate 116 extend beyond the electro-optic layer 112, and in the extended portion of the front electrode 114 and front substrate 116, a conductive via 118 formed from silver ink electrically connects the front electrode 114 to circuitry provided on the backplane 102, while an adhesive layer 120 secures the extended portion of the front electrode 114 to the backplane 102.

Over the front substrate 116 are disposed in succession a first layer 122 of optically clear adhesive, a barrier film 124, a second layer 126 of optically clear adhesive and a further, relatively thick protective film 128 provided on its exposed surface with an anti-glare coating (not shown). The protective film 128 acts to block ultra-violet radiation from reaching the electro-optic layer 112, and also prevents atmospheric moisture or other contaminants reaching this layer.

In order to form a complete seal around the electro-optic layer 112, the barrier film 124, the second layer 126 of optically clear adhesive and the protective film 128 are all made larger in both dimensions than the front substrate 116, so that the layers 124,126 and 128 are have peripheral which extend or "overhang" the outer edges of the front substrate 106. To complete the sealing of the electro-optic layer 112, a curable edge sealing material is injected, typically via a needle dispenser, into the area of the overhang, and cured to form an edge seal 130 completely surrounding the electro-optic layer 112.

There are only a limited number of commercially available edge sealing materials which have all the properties required for use in such an electro-optic display, and most of these materials are cured by ultra-violet radiation. However, in the preferred display shown in the drawing, and in similar displays in which the electro-optic medium is covered by a UV-absorbing protective layer, the presence of the protective layer, which is essentially opaque to UV radiation, renders it difficult to cure the sealing material. In the preferred display shown in the drawing, in practice it is necessary to cure the sealing material by irradiating it from the side, which requires expensive capital equipment and requires large radiation penetration depths (several millimeters in typical cases). Moreover, the capital equipment needs to be custom designed for a specific display size, so new equipment needs to be purchased for non-trivial size changes in the product.

There is thus a need for a process for curing sealing material in an electro-optic display have a UV-absorbing protective layer, which process does not require side irradiation of the sealing material and the need for expensive equipment to perform such side irradiation, and the present invention seeks to provide such a process.

SUMMARY OF INVENTION

Accordingly, this invention provides a process for curing an edge sealing material in an electro-optic display, the display comprising a backplane; a layer of electro-optic material disposed adjacent the backplane; and a protective layer capable of absorbing ultra-violet radiation and disposed on the opposed side of the layer of electro-optic material from the backplane, the protective layer extending beyond the edge of the layer of electro-optic material, thereby defining a peripheral region in which a gap exists between the protective layer and the backplane. The process comprises:

placing in the gap an uncured edge sealing material curable by radiation transmitted by the protective layer; and transmitting the radiation effective to cure the edge sealing material through the protective layer, thereby curing the edge sealing material and forming an edge seal in the gap.

In this process, the radiation used to cure the edge sealing material has a wavelength greater than about 385 nm, desirably greater than about 395 nm and preferably greater than about 405 nm. The edge sealing material may comprise 5,7-diiodo-3-butoxy-6-fluorone as a curing initiator. The edge sealing material may comprise a curable acrylate and may also comprise a filler, for example silica. Typically, the cured edge sealing material has a width in the plane of the layer of electro-optic material greater than its thickness perpendicular to this plane. The placement of the uncured edge sealing material within the gap may be effected by dispensing a bead of uncured edge sealing material adjacent the gap, thereby causing the edge sealing material to be drawn into the gap by capillary forces. In such a process, at least one of the uncured edge sealing material and the display may heated during dispensing of the edge sealing material to speed movement of the uncured edge sealing material into the gap.

In the process of the present invention, the layer of electro-optic material may make use of any of the types of electro-optic material discussed above. For example, the electro-optic material may be a rotating bichromal member material, or an electrochromic material. Alternatively, the electro-optic material may be a particle-based electrophoretic material comprising a plurality of electrically charged particles disposed in a suspending fluid and capable of moving therethrough on application of an electric field to the suspending fluid. In such an electrophoretic material, the suspending fluid may be liquid or gaseous. Also, such an electrophoretic material may be encapsulated, i.e., the suspending fluid and the electrically charged particles may b e held within a plurality of capsules or microcells.

BRIEF DESCRIPTION OF DRAWING

As already indicated, the sole FIGURE of the accompanying drawing is a schematic section through an edge-sealed electro-optic display which may be produced by the process of the present invention.

DETAILED DESCRIPTION

As already mentioned, the present invention provides a process for providing an edge seal in an electro-optic display. The display comprises a backplane; a layer of electro-optic material disposed adjacent the backplane; and a protective layer capable of absorbing ultra-violet (UV) radiation and disposed on the opposed side of the layer of electro-optic material from the backplane. The protective layer extends beyond the edge of the layer of electro-optic material, thereby defining a peripheral region in which a gap exists between the protective layer and the backplane. To form the edge seal, there is placed in the gap an uncured edge sealing material curable by radiation transmitted by the protective layer, and radiation effective to cure the edge sealing material is transmitted through the protective layer, thereby curing the edge sealing material and forming an edge seal in the gap.

Thus, in accordance with this invention, the edge seal is formed from a edge sealing material which is cured using radiation having a wavelength longer than the UV radiation absorbed by the protective layer, so that the radiation can be transmitted through the protective layer, rather than having to be applied from the side as in the prior art process described above. In practice, this will typically mean that the edge sealing material will contain a photoinitiator that is sensitive to these longer wavelengths of light. The UV-absorbing protective layer may be customized for the application at hand, but typically transmits less than 25% of the incident light at 385 nm, less than 60% of the incident light at 395 nm, and less than 75% of the incident light at 405 nm.

As will readily be apparent to those skilled in the construction of electro-optic displays, the "protective layer" of the display formed by the present process may be a composite of several separate layers. For example, in the display shown in the drawing, the barrier film 124, the layer 126 of optically clear adhesive and the protective film 128 may all be regarded as part of the "protective layer". Obviously, the exact number and type of layers present within the "protective layer" is essentially irrelevant for purposes of the present invention provided that radiation effective to cure the edge sealing material can be transmitted through all the layers. Also, of course, it is not required that the protective layer be completely transparent to the radiation needed to cure the edge sealing material; considerable absorption of the radiation by the protective film can be tolerated provided that sufficient radiation is transmitted to effect curing within a tolerable processing time. Thus, the exact form of "protective film" used in the present process can vary widely depending upon the exact type of protection needed by the specific electro-optic material being used.

To minimize the total required exposure (curing) time, the edge sealing material should preferably react at wavelengths above 385 nm, even more preferably above 395 nm, and even most preferably above 405 nm. Photoinitiators sensitive at these wavelengths can include, for example, 5,7-diiodo-3-butoxy-6-fluorone (available under the trade name "H—Nu 470" from Spectra Group Limited, Maumee, Ohio) which has peak absorption between approximately 380 nm and 520 nm. Other chemical agents known to those skilled in the art of formulating such adhesives can readily be identified.

Edge sealing materials made using visible light photoinitiators are now commercially available from 3M Corporation (Minneapolis, Minn.), as models #LC-1210, 1211, 1212, 1213, and 1214), from Dymax (Torrington, Conn.) as Ultra-Light Weld material ("Ultra-Light Weld is a Registered Trade Mark), from Threebond Corporation (Cincinnati, Ohio) as models #1771E, 1773E, and 1776E, and from other such manufacturers. These materials are often based on acrylate chemistry (the Threebond material is of this type), but other base chemistries may also be used. Also, it should be noted that these sealing materials may be loaded with filler material (e.g. silica particles) to enhance one or more performance attributes (e.g. mechanical properties, permeability properties, optical opacity, etc.).

Using such a sealing material, one can simply cure the sealing material from the front side of the display through the UV-absorbing protective layer. This eliminates the need for highly customized, expensive UV curing systems. Also, the present process allows a single curing system to cure edge seals on widely varying display sizes. Moreover, the present process minimizes the risk of exposing any ultra-violet sensitive materials used in the electro-optic display to harmful radiation, as may occur when such radiation is applied from the side to an edge sealing material, which may permit some fraction of the radiation to pass through the sealing material into the electro-optic material itself.

Additionally, since edge seals tend to be most effective when made thin and wide (i.e., such seals typically have substantially larger dimension parallel to the planes of the backplane and the layer of electro-optic material than perpendicular to these planes), the present invention can improve both throughput and sealing material cure uniformity. By curing through the front protective layer of the display, rather than from the side (i.e. through the width of the sealing material), curing times can be dramatically reduced. This increase in throughput is highly desirable to reduce manufacturing costs for electro-optic displays.

In order to achieve further increases in manufacturing throughput during the sealing material dispensing process, the use of advanced dispensing systems is advantageous. Generally, simpler systems slowly deposit a bead of edge sealing material around the periphery of the electro-optic material, and rely upon capillary forces to draw the sealing material into the edge seal cavity (gap). It is helpful to heat the sealing material and the display to reduce the viscosity of the sealing material during this dispensing process to allow for increased dispensing speed. It is possible to use a more sophisticated dispensing system in order to achieve higher throughput than is possible with this capillary approach. In the preferred embodiment, a dispenser with five degrees of freedom (x-y-z Cartesian degrees of freedom, rotation $\beta$ around an axis normal to the plane of the backplane and angle $\gamma$ above the plane of the backplane) may be employed. This multiple degree of freedom arrangement allows the dispensing needle to always be positioned at a fixed angle (measured above the plane of the backplane) above the normal drawn outward from the edge seal cavity (gap) in the plane of the backplane. The multiple degree of freedom arrangement enables one to truly "inject" the sealing material at high speed into the gap at the edge of the display, thus enabling increased throughput.

It will be apparent to those skilled in the technology of electro-optic displays that numerous changes and modifications can be made in the preferred embodiments of the present invention already described without departing from the spirit and scope of the invention. Accordingly, the whole of the foregoing description is to be construed in an illustrative and not in a limitative sense.

What is claimed is:

1. A process for curing an edge sealing material in an electro-optic display, the display comprising:
    a backplane;
    a layer of a solid electro-optic material disposed adjacent the backplane; and
    a protective layer capable of absorbing ultra-violet radiation and disposed on the opposed side of the layer of solid electro-optic material from the backplane, the protective layer extending beyond the edge of the layer of electro-optic material, thereby defining a peripheral region in which a gap exists between the protective layer and the backplane;
    the process comprising:
    placing in the gap an uncured edge sealing material curable by radiation transmitted by the protective layer; and
    transmitting the radiation effective to cure the edge sealing material through the protective layer, thereby curing the edge sealing material and forming an edge seal in the gap.

2. A process according to claim 1 wherein the radiation used to cure the edge sealing material has a wavelength greater than about 385 nm.

3. A process according to claim 2 wherein the radiation used to cure the edge sealing material has a wavelength greater than about 395 nm.

4. A process according to claim 3 wherein the radiation used to cure the edge sealing material has a wavelength greater than about 405 nm.

5. A process according to claim 1 wherein the edge sealing material comprises 5,7-diiodo-3-butoxy-6-fluorone.

6. A process according to claim 1 wherein the edge sealing material comprises a curable acrylate.

7. A process according to claim 1 wherein the edge sealing material comprises a filler.

8. A process according to claim 7 wherein the filler comprises silica.

9. A process according to claim 1 wherein the cured edge sealing material has a width in the plane of the layer of electro-optic material greater than its thickness perpendicular to this plane.

10. A process according to claim 1 wherein the placement of the uncured edge sealing material within the gap is effected by dispensing a bead of uncured edge sealing material adjacent the gap, thereby causing the edge sealing material to be drawn into the gap by capillary forces.

11. A process according to claim 10 wherein at least one of the uncured edge sealing material and the display is heated during dispensing of the edge sealing material.

12. A process according to claim 1 wherein the solid electro-optic material is a rotating bichromal member material.

13. A process according to claim 1 wherein the solid electro-optic material is an electrochromic material.

14. A process according to claim 1 wherein the solid electro-optic material is a particle-based electrophoretic material comprising a plurality of electrically charged particles disposed in a suspending fluid and capable of moving therethrough on application of an electric field to the suspending fluid.

15. A process according to claim 14 wherein the suspending fluid is gaseous.

16. A process according to claim 14 wherein the suspending fluid and the electrically charged particles are held within a plurality of capsules or microcells.

* * * * *